United States Patent [19]

Stirling

[11] Patent Number: 5,043,104
[45] Date of Patent: Aug. 27, 1991

[54] APPARATUS FOR GAS ABSORPTION IN A LIQUID

[75] Inventor: Thomas E. Stirling, Sugarloaf, Pa.

[73] Assignee: Barrett Haentjens & Co., Hazleton, Pa.

[21] Appl. No.: 363,328

[22] Filed: Jun. 8, 1989

Related U.S. Application Data

[63] Continuation of Ser. No. 116,670, Nov. 4, 1987, abandoned.

[51] Int. Cl.$^5$ .......................... C02F 1/78; B01F 3/04
[52] U.S. Cl. .................................. 261/77; 261/93; 261/124; 261/DIG. 71; 261/DIG. 42; 210/219; 210/220
[58] Field of Search ............... 210/758, 760, 219, 220; 261/93, 121.1, DIG. 42, DIG. 71, DIG. 75, 77, 124

[56] References Cited

U.S. PATENT DOCUMENTS

| | | | |
|---|---|---|---|
| 3,827,679 | 8/1974 | Kaelin | 210/219 X |
| 4,017,565 | 4/1977 | Müller | 261/DIG. 75 |
| 4,029,724 | 6/1977 | Muller et al. | 261/93 X |
| 4,259,267 | 3/1981 | Wang | 210/220 X |
| 4,267,052 | 5/1981 | Chang | 210/219 X |
| 4,282,172 | 8/1981 | McKnight | 261/DIG. 75 |
| 4,290,885 | 9/1981 | Kwak | 210/220 X |
| 4,454,077 | 6/1984 | Litz | 210/219 X |
| 4,530,803 | 7/1985 | Kuckens | 261/93 X |
| 4,555,335 | 11/1985 | Burris | 210/220 X |

OTHER PUBLICATIONS

Article by McKeon et al., "A Major Ozonation/Direct Filtration Water Treatment Facility", Public Works, Sept. 1987, pp. 90-92.

Article by Weng et al., "Ozonation: An Economic Choice for Water Treatment", Journal AWWA Research and Technology, Nov. 1986, pp. 83-86.

Publication entitled "Ozone", by Infilco Degremont Inc., Sept. 1977, pp. 6 and 7, no author given.

Primary Examiner—Thomas Wyse
Attorney, Agent, or Firm—Hill, Van Santen, Steadman & Simpson

[57] ABSTRACT

An apparatus and method for increasing gas absorptiion in a liquid includes, in a first embodiment, gas injection airfoils at an inlet of an extended vertical tube and a pump at an outlet of the tube for drawing the liquid at a rate greater than the rise rate of the gas bubbles. An outlet of the pump preferrably includes a plurality of outlet nozzles. A second embodiment for use with a liquid or slurry includes a venturi gas inlet in place of the airfoils.

10 Claims, 3 Drawing Sheets

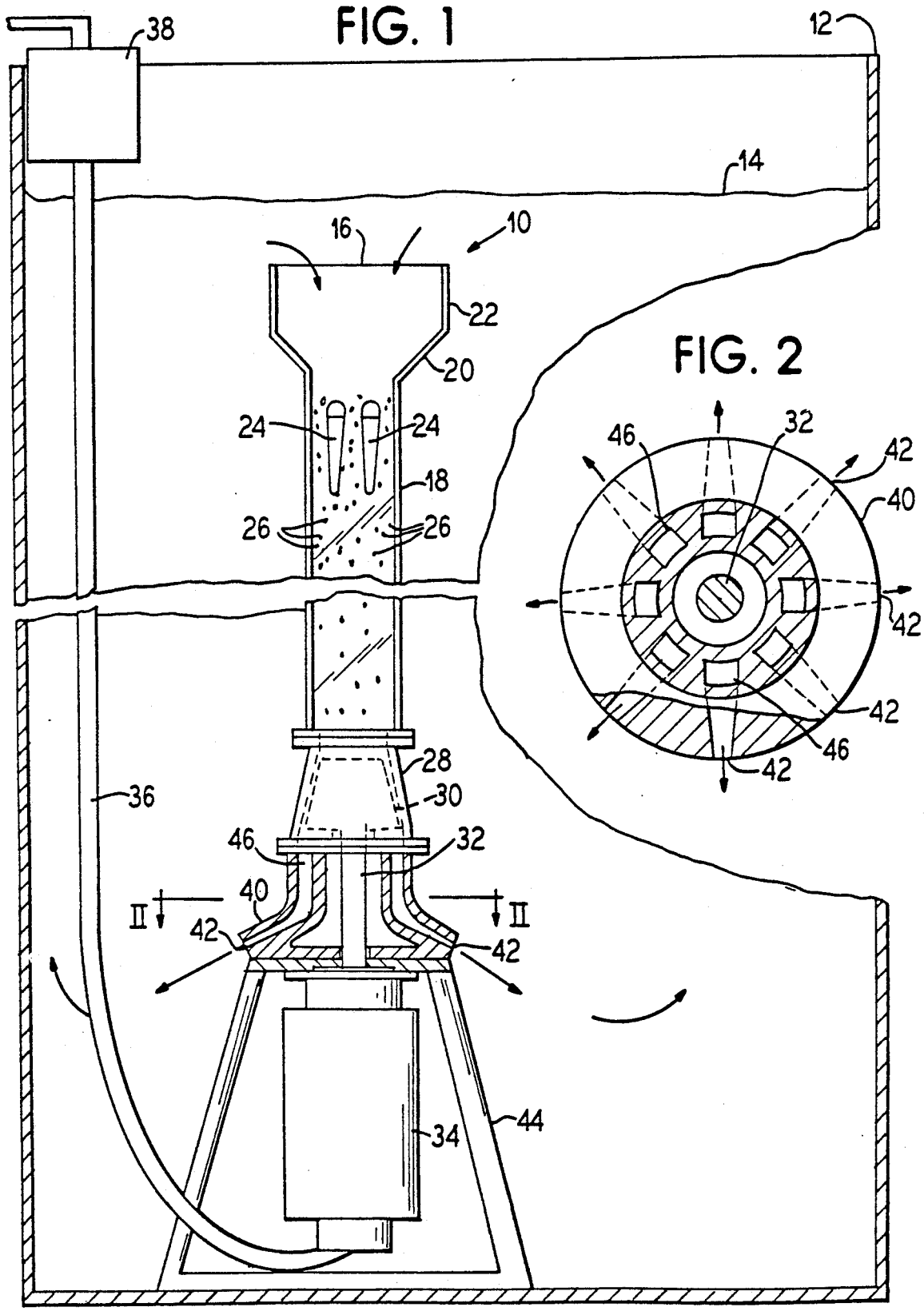

APPARATUS FOR GAS ABSORPTION IN A LIQUID

This is a continuation of application Ser. No. 116,670, filed 11/4/87, now abandoned.

BACKGROUND OF THE INVENTION

1. Field of the Invention

The present invention relates generally to an apparatus and method for adding a gas or liquid to a liquid, and more particularly, for effecting absorption of a gas in a liquid.

2. Description of the Related Art

Water treatment for potable water supplies frequently involves the addition of chlorine to maintain water quality. However, the use of chlorine leaves carcinogenic residuals in the water in quantities which are unacceptable. It has been found that treatment by ozone enables smaller amounts of chlorine to be used to maintain the purity of the water in a water supply system.

Devices are known for injecting ozone or other gases into water for purification. In these devices, the gas is bubbled into a liquid stream for absorption at atmospheric pressure and submergence.

SUMMARY OF THE INVENTION

An object of the present invention is to provide increased absorption of a gas into a liquid.

Another object of the invention is to provide effective water treatment using reduced levels of chlorine in a water supply system.

Another object of the invention is to provide means for ozone treatment of water for a water supply system.

A further object of the invention is to provide for nearly complete absorption of a gas into a liquid at increased absorption rates.

Yet another object is to effectively add a gas or liquid to a liquid with an increased dwell time and efficient mixing.

These and other objects of the invention are provided in a method and apparatus for injecting gas or liquid at a low pressure into a liquid and then directing the mixture into a pump. When a gas is injected into the liquid, the gas and liquid mixture is caused to flow downward prior to reaching the pump to increase the dwell time of the gas bubbles in the liquid. Because of the increasing depth of liquid, the pressure of the gas and liquid mixture increases during the downward flow, thereby reducing the size of the bubbles and increasing the absorption rate of the gas into the liquid. The rate of downward flow of the liquid and gas mixture is slightly greater than the upward motion of the gas bubbles so that a higher concentration of the gas bubbles is drawn into the pump. The liquid and gas mixture is then discharged under pressure from the apparatus into a reservior of the liquid.

The apparatus of the invention is generally either supported or suspended within a tank and has a liquid inlet below the liquid level in the tank. Within the inlet, the gas or a second liquid is injected into the liquid. In one development, the in-flowing liquid creates a low pressure zone which draws in the gas or second liquid, such as by flowing over airfoils having feed openings on low pressure surfaces, so that a pressurized feed is not required. In another development, the liquid inlet is maintained at a constant level below the liquid surface. This ensures that the apparatus can operate regardless of the liquid level.

A generally vertically oriented tube extends from the liquid inlet to an inlet of the pump so that the liquid and gas mixture are drawn downwardly opposite the direction of the gas bubbles, which increases the dwell time of the gas in the liquid. The liquid and gas mixture is agitated and mixed by the pump and is then forced out a pump outlet. At least one, and preferrably a plurality of nozzles are provided at the outlet of the pump for directing the liquid and gas mixture back into the liquid reservoir.

Thus, the gas is in contact with the liquid for an increased length of time, the dwell time of the gas bubbles in the liquid being controlled by the flow rate in the vertically disposed tube. Furthermore, the absorption of the gas into the liquid is increased by the increasing pressures present as the liquid and gas mixture flows downward through the tube. Once in the pump, the pump impeller imparts energy to the mixture which further reduces the bubble size and mixes the gas and liquid, after which the liquid and gas mixture is subjected to a back pressure created by the nozzles at the outlets of the pump. The back pressure increases the gas absorption rate as taught by Stearns in his U.S. Pat. No. 3,477,581.

Once discharged from the apparatus, the gas bubbles have a still further opportunity for absorption while rising to the surface of the liquid within the resevoir. The absorption of the gas into the liquid is even further enhanced by directing the nozzles of the device somewhat downwardly so that the travel time of the bubbles through the liquid is increased. The nozzles also disperse the liquid and gas mixture throughout the container or reservoir.

The method and apparatus of the present invention are particularly useful in effecting ozone, oxygen or air absortion during potable water treatment, and, when ozone is used, a reduced amount of chlorine is required while maintaining the quality of the water. It is expected that absorption of the ozone or other gas into the water will be such that little, if any, of the gas bubbles leave the liquid. It is also contemplated that the present apparatus can be used for carbonation of beverages and the like, as well as for other gas/liquid or liquid/liquid mixing operations, and may even be useful in gas/gas mixing. In these instances, the two fluids being mixed preferrably have different specific gravities to enable the dwell time to be controlled and increased.

BRIEF DESCRIPTION OF THE DRAWINGS

FIG. 1 is a vertical cross section of an apparatus according to the principles of the present invention in use in a liquid reservoir;

FIG. 2 is a cross section along line II—II of FIG. 1 showing a pump outlet arrangement for the apparatus;

DESCRIPTION OF THE PREFERRED EMBODIMENTS

Figure 3:
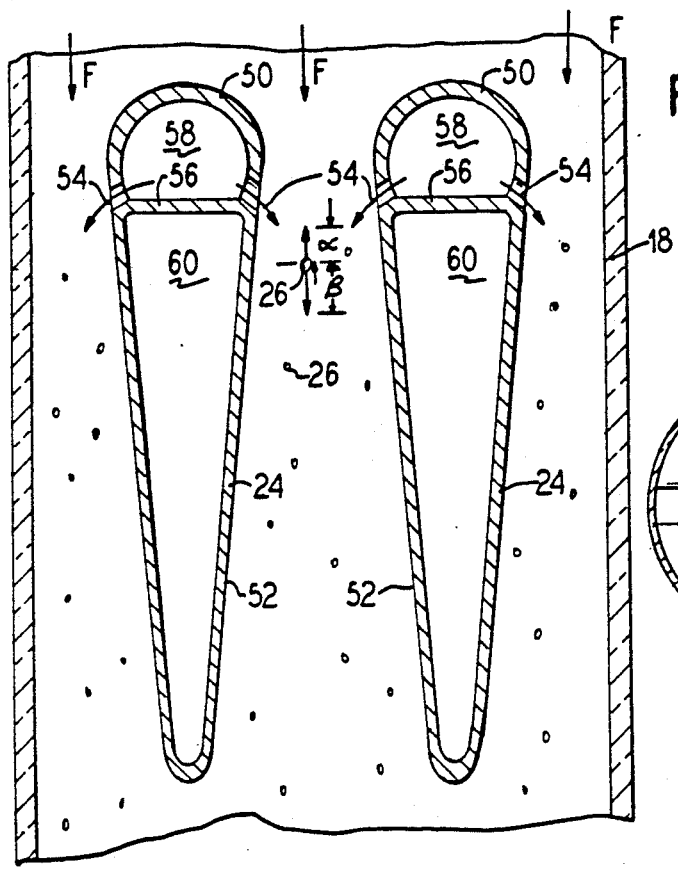
FIG. 3 is an enlarged detail of an airfoil arrangement at the liquid inlet of the apparatus of FIG. 1.

In FIG. 1, is shown an apparatus 10 within a tank 12 filled with liquid 14. For example, the liquid 14 can be water in a water treatment system to which ozone or oxygen is to be added, although it can also be a liquid into which gas, such as carbon dioxide or the like, is to be mixed or any two fluids preferrably of differing specific gravities. The apparatus 10 has an inlet opening 16 into which the liquid 14 is drawn for passage through a vertical tube 18. Although a vertical tube 18 is preferred, it is of course possible for the tube 18 to be inclined as well, however, not at an angle exceeding 45 degrees. In the illustrated example, the inlet 16 is of a larger diameter than the tube 18. The enlarged inlet 16 is formed by a frusto-conical wall 20 connecting the tube 18 to a larger diameter wall 22.

Within the tube 18, are one or more airfoils 24 which inject a gas or liquid, such as ozone, into the liquid 14. After injection of the gas or liquid, the mixture flows downward through the tube 18 at a flow rate such that gas bubbles 26 will not rise to the surface. The tube 18 is connected at its lower end to a pump 28 which draws the liquid 14 downward along the vertical extent of the tube 18. The tube 18 can be as short as one foot or as long as 40 or more feet. The pump 28 includes an impeller 30 mounted therewithin on a shaft 32 which is driven by a drive motor 34. The drive motor 34 is suspended below the device 10 and is of a submersible design, including liquid tight seals and the like. A power cable 36 connects the drive motor 34 to a control box 38 which can include a power switch and/or a speed control.

At an outlet of the pump 28 is mounted a nozzle housing 40 which includes a plurality of nozzle openings 42 for directing the liquid 14 back into the tank 12. The nozzles 42 of the illustrated example are directed somewhat downwardly in a mutually opposed radial direction to provide increased dispersion of the gas-treated liquid.

The device 10 is shown mounted on a base 44 resting on a floor of the tank 12. It is also possible to suspend the unit 10 from a structure over the tank 12 or even to provide a floating support (not shown).

Referring now to FIG. 2, the nozzle housing 40 includes eight of the nozzles 42 directed radially outward in the nozzle housing 40 at equally spaced intervals. Each of the nozzles 42 includes a feed channel 46 which transmits the gas-treated liquid 14 from the pump 28 to the individual nozzles 42. Although other nozzle arrangements are possible, the illustrated nozzle design disperses the gas-treated liquid throughout the tank 12. The outlet opening of each nozzle 42 is somewhat smaller than the respective feed channel 46 so that a back pressure is generated at the nozzles 42 by the pump 28. A nozzle outlet pressure for the present device of 10 psi has been found to be ideal for ozone or $O_3$, while an outlet pressure of 20 psi is better for oxygen or $O_2$.

In FIG. 3, two of the airfoil members 24 are positioned within the vertical tube 18, each of the airfoils 24 including a forward high pressure surface 50 and a low pressure surface 52 relative to the flow of the liquid 14 as indicated by arrows F. The forward surfaces 50 of the airfoils 24 create high pressure regions in the liquid 14 during the flow of the liquid, while a low pressure is created at the low pressure surfaces 52. Openings 54 are provided in the low pressure surfaces 52 extending through to the interior of the airfoils 24. Internally of each of the airfoils 24, a divider wall 56 is provided to divide each airfoil into two chambers 58 and 60. The openings 54 are in communication with the first chamber 58 from which a fluid is fed. The low pressure at the openings 54 draws the fluid through the openings so that the fluid feed need not be pressurized.

The bubbles 26 of gas which have been drawn from the openings 54 have an upward velocity shown schematically at $\alpha$. The flow rate of the liquid has a downward velocity as indicated at $\beta$. In a preferred example, the liquid flow rate $\beta$ is greater by a small amount than the upward velocity $\alpha$ of the bubbles 26.

Figure 4:
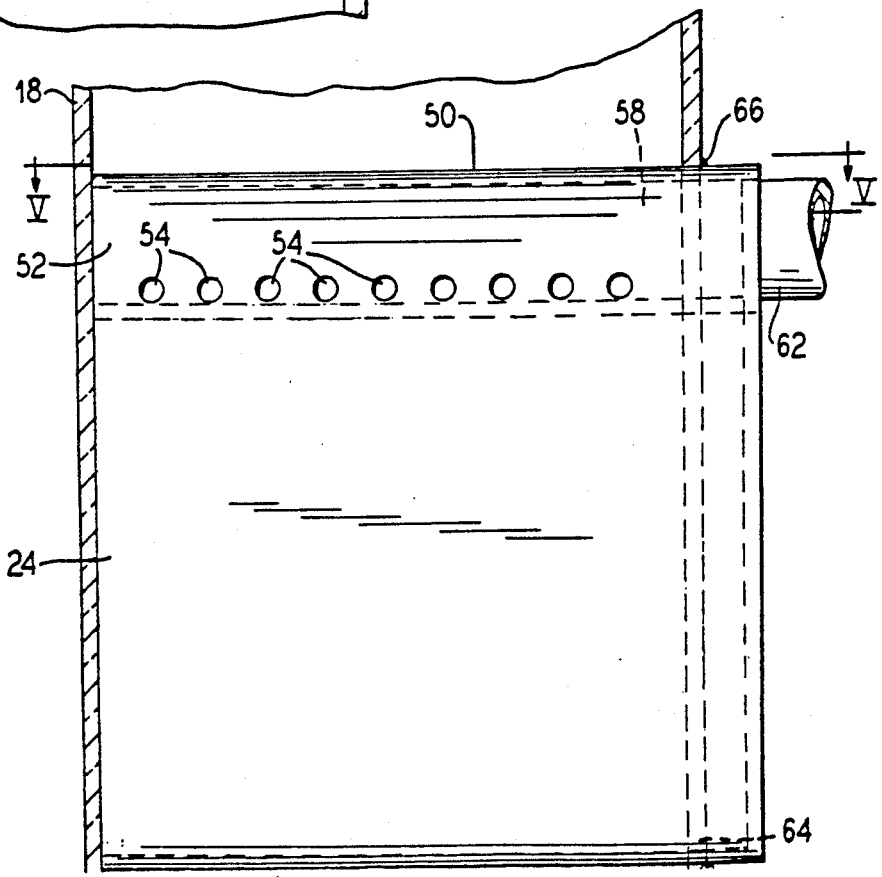
FIG. 4 is a side elevational view of an airfoil of FIG. 3.

Referring now to FIG. 4, the airfoil 24 extends across the extent of the tube 18 and includes one or more of the gas outlet openings 54 along the low pressure surface 52. The first chamber 58 in which the openings 54 are provided is supplied with a gas or other fluid through a conduit line 62. The airfoil unit 24 has been mounted within the tube 18 through an opening 64 cut in the side of the tube 18, the opening 64 being sealed with a sealant 66 provided around the interface of the airfoil 24 with the tube 18.

Figure 5:
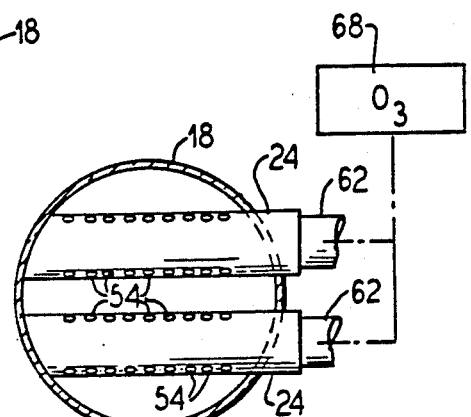
FIG. 5 is a cross section of FIG. 4 showing the airfoil arrangement of the present invention.

In FIG. 5 can be seen a preferred embodiment including two of the airfoils 24 mounted within the cylindrical tube 18 and connected to a single gas supply source 68 which, for example, contains ozone for use in water purification. Since the openings 54 on the low pressure surface 52 draw the gas or other fluid from the source 68, the source 68 need not be under pressure, although it certainly may. The source 68 can even be an open tube for aspirating air or enriched air.

The device of the first embodiment operates by drawing in the liquid 14 at the inlet 16 so that it flows past the airfoils 24. The flowing liquid 14 creates low pressure regions adjacent the gas outlet openings 54, which in turn causes bubbles of the gas to be drawn through the openings 54 and into the liquid. The gas can either be induced by the velocity over the airfoil section or can be supplied under pressure for a greater flow rate. Since the liquid flow rate $\beta$ is greater than the gas bubble rise rate $\alpha$, the gas bubbles are carried down the tube 18 at a relatively slow rate to result in a concentrated mixture of gas and liquid. The counteracting flows of liquid and gas thereby increase the dwell time of the bubbles 26 in the liquid. As the mixture descends down the tube 18, the increasing static pressure reduces the size of the bubbles 26 and increases the absorption rate of the gas into the liquid 14. The compressed mixture then enters the pump 28 which mixes the liquid and gas and further reduces the size of the bubbles 26. The mixture is then discharged through the nozzles 42. The nozzle outlet pressure of one embodiment, for example, is between 10 to 20 pounds per square inch so that a back pressure is provided at the nozzles for further gas absorption. Since the nozzles 42 are directed downwardly, any gas bubbles which have yet to be absorbed will traverse a greater path to rise to the surface of the liquid and thereby facilitate even further gas absorption by the liquid.

Figure 6:
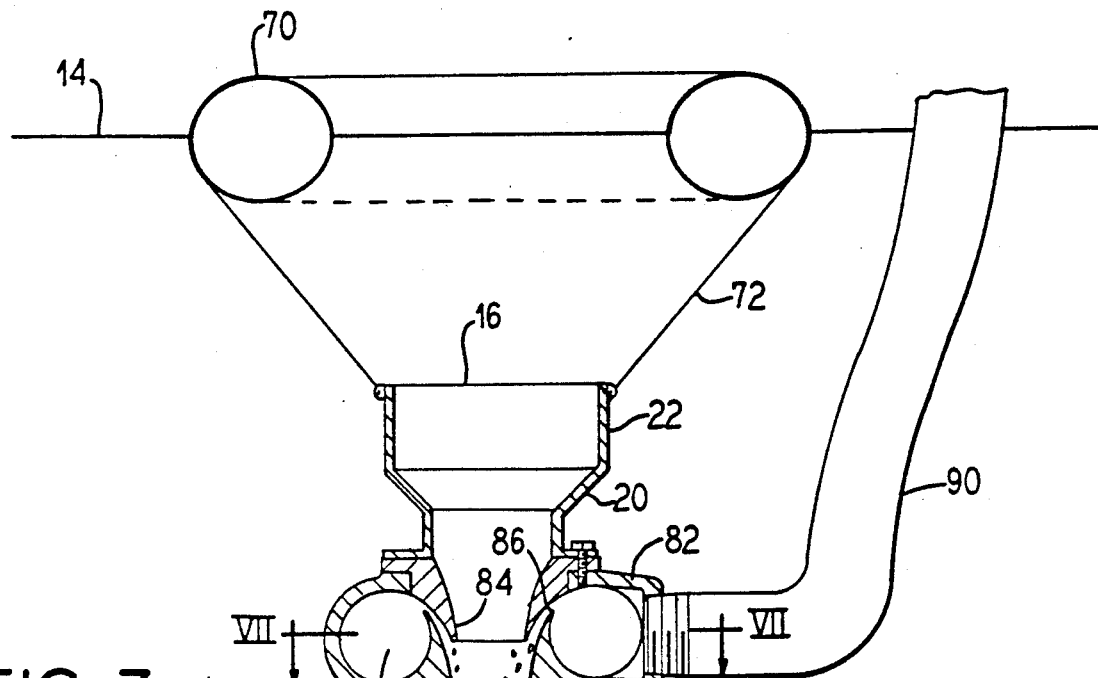
FIG. 6 is a vertical cross section of a second embodiment of the invention.

A second embodiment is shown in FIG. 6, which differs from the first embodiment in several aspects. Where like elements are common between the first and second embodiments, the same reference characters have been used. A float 70 rides on the surface 14 of the liquid and supports the inlet 16 at a fixed distance below the surface 14. Although other shapes are possible, a ring shaped float 70 is shown, with the inlet 16 being suspended therebelow on cables 72.

The tube 18 is flexible to accomodate vertical movement of the inlet 16 as the liquid level 14 changes. A telescoping connection 74 is provided, having an inner sleeve 76 and an outer sleeve 78 in sliding relation, preferrably with a gasket 80 or other sealing means therebetween. It is also possible for the tube 18 to simply be flexible, such as of a flexible corrigated tube.

The gas feed arrangement of this embodiment differs from that of the first embodiment in that a venturi inlet housing 82 is mounted adjacent the inlet 16. The venturi inlet housing 82 includes an annular constriction 84 which reduces the diameter of the flow path, behind which is an annular gas feed opening 86 which is connected to a chamber 88. A gas or other fluid is fed into the chamber 88 by a supply hose 90 which extends to a source of fluid to be mixed into the liquid. As shown, the supply hose 90 can simply draw the gas from the environment since there is no need to pressurize the gas. The enviromental gas can be air or, when the process occurs in a sealed vessel, any other gas.

Figure 7:
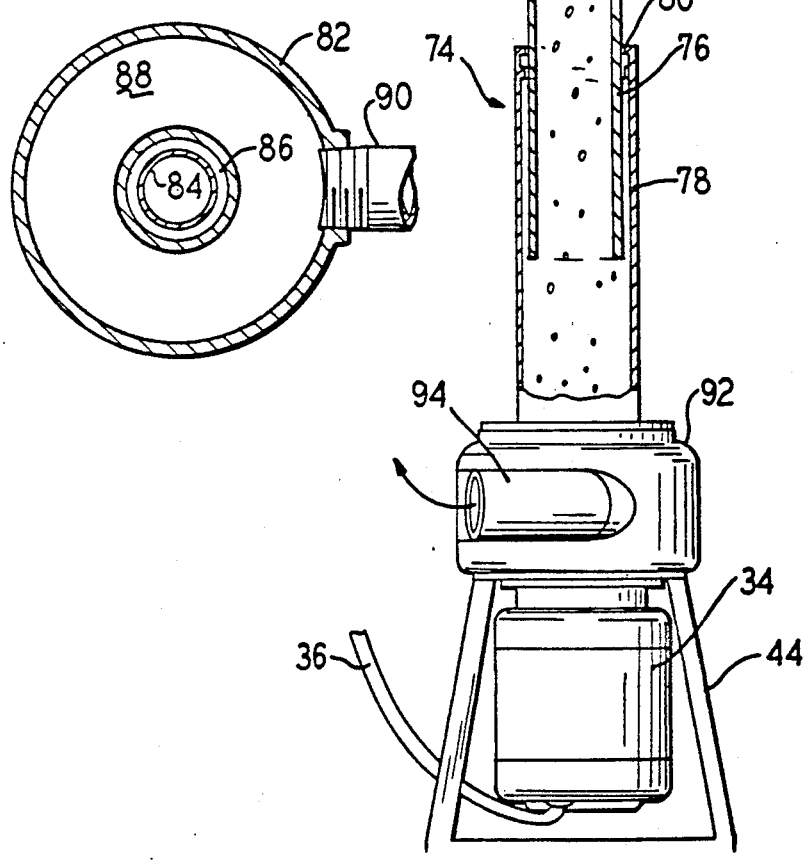
FIG. 7 is a cross section along line VII—VII of FIG. 6 showing a venturi air inlet.

In FIG. 7, the venturi inlet housing 82 and the chamber 88 extends around the tube 18. Referring again to FIG. 6, the liquid and gas bubble mixture flows down the tube 18 at a rate slightly greater than the rise rate of the bubbles and into a pump 92. The pump 92 is a centrifugal pump. The pump 92 has a tangentially directed outlet 94 from which the mixture is ejected back into the liquid. It is contemplated to connect a conduit (not shown) to the outlet 94 to feed the liquid and gas mixture to a separate reservoir.

The second embodiment, and in particular the gas feed arrangement of the second embodiment, are useful for injecting gas not only into a liquid, but also for injecting a gas or other fluid into a slurry. The gas feed arrangement shown in FIGS. 6 and 7 is less likely to become blocked or otherwise impeded than an embodiment having airfoils extending across the intake opening, although this depends on the consistancy of the slurry.

Thus, there has been described and shown a method and apparatus for increasing gas absorption in a liquid. The invention is particularly useful in increasing ozone or air absorption in water treatment facilities. It is also possible to use the present invention to inject carbon dioxide into beverages, and the like, or to mix two liquids or two gases together.

Although other modifications and changes may be suggested by those skilled in the art, it is the intention of the inventor to embody within the patent warranted hereon all changes and modifications as reasonably and properly come within the scope of his contribution to the art.

I claim:

1. An apparatus for effecting gas absortpion in a liquid, comprising:
   a container containing a liquid;
   a vertically oriented tubular member positioned in said container such that a top end thereof is positioned below gthe surface of the liquid, said tubular member forming a flow path of said liquid through said tubular member from said top end to a bottom end thereof;
   gas introducing means disposed within said vertically oriented tubular member, said means comprising one or more vertically oriented air foil members having oppositely positioned high and low pressure surfaces, said gas introducing means being connected to a source of gas and operative to release said gas into said flow of liquid;
   a nozzle housing attached to said bottom end of said vertically oriented tubular member including nozzles formed to direct a flow of said liquid and said gas downwardly into said container;
   a pump operatively connected to the bottom end of said nozzle housing such that an impeller thereof is positioned within said vertically oriented tube upstream of said nozzle housing, said pump being operated such that said liquid is drawn vertically downward through said vertically oriented tubular member such that said gas is drawn from said gas introducing means into said downwardly directed liquid flow and such that the rate of flow is greater than an upward movement direction of bubbles of said gas in the liquid.

2. The apparatus of claim 1, wherein said nozzles in said nozzle housing are tapered in diameter so as to provide means for establishing back pressure in the liquid and gas at said outlet of said pump.

3. The apparatus of claim 2, wherein said back pressure is 10 psi.

4. The apparatus of claim 2, wherein said back pressure is 20 psi.

5. The apparatus of claim 1, wherein said pump includes a liquid submersible pump motor.

6. The apparatus of claim 1, wherein said nozzle housing includes eight nozzles.

7. The apparatus of claim 1, wherein said nozzles of said nozzle housing are constructed such that said liquid and gas are discharged downwardly in mutually opposed radial directions.

8. The apparatus of claim 1, wherein said gas discharge means comprises two air foil members, each including an upper high pressure surface and a lower low pressure surface relative to the flow of liquid through said vertically oriented tubular member.

9. The apparatus of claim 1, wherein said tubular member includes a venturi formed upstream of said one or more air foil members.

10. The apparatus of claim 1, wherein said tubular member is circular in horizontal cross-section.

* * * * *